(12) United States Patent
Sharp (10) Patent No.: US 6,948,274 B1
(45) Date of Patent: *Sep. 27, 2005

(54) ADJUSTABLE-DEPTH CRANKBAIT FISHING LURE

(76) Inventor: Scott M. Sharp, 22804 W. Hilton Ave., Buckeye, AZ (US) 85326

( * ) Notice: Subject to any disclaimer, the term of this patent is extended or adjusted under 35 U.S.C. 154(b) by 0 days.

This patent is subject to a terminal disclaimer.

(21) Appl. No.: 10/430,595

(22) Filed: May 7, 2003

Related U.S. Application Data (63) Continuation-in-part of application No. 09/547,578, filed on Apr. 12, 2000, now Pat. No. 6,804,910, which is a continuation-in-part of application No. 09/353,909, filed on Jul. 15, 1999, now abandoned.

(51) Int. Cl.[7] .............................................. A01K 85/00
(52) U.S. Cl. .................................................. 43/42.22
(58) Field of Search ........................... 43/42.03, 42.22, 43/42.47

(56) References Cited

U.S. PATENT DOCUMENTS

| | | | | | |
|---|---|---|---|---|---|
| 2,484,162 | A | * | 10/1949 | Golebeski | 43/42.22 |
| 2,608,016 | A | * | 8/1952 | Shipley | 43/42.22 |
| 2,608,790 | A | * | 9/1952 | McFarland | 43/42.46 |
| 2,691,234 | A | * | 10/1954 | Riley | 43/26.2 |
| 3,626,628 | A | * | 12/1971 | Weimer | 43/42.03 |

* cited by examiner

*Primary Examiner*—Kurt Rowan
(74) *Attorney, Agent, or Firm*—Parsons & Goltry; Michael W. Goltry; Robert A. Parsons (57) ABSTRACT

A fishing lure includes a body with first and second opposed sides, a first member rotatably carried by the body and having first and second end portions disposed adjacent the respective sides of the body, a fin carried by each of the terminal end portions of the first member, and a second member rotatably carried by the body. A mechanism interacts with the first member and the second member, whereby rotation of the second member urges corresponding rotation of the first member.

16 Claims, 6 Drawing Sheets

ADJUSTABLE-DEPTH CRANKBAIT FISHING LURE

CROSS-REFERENCE TO RELATED APPLICATIONS

This application is a continuation-in-part of application Ser. No. 09/547,578, filed Apr. 12, 2000 now U.S. Pat. No. 6,804,910, which is a continuation-in-part of application Ser. No. 09/353,909, filed 15 Jul. 1999 now abandoned.

FIELD OF THE INVENTION

The present invention relates to fishing lures and, more particularly, to adjustable depth fishing lures.

BACKGROUND OF THE INVENTION

Typically, the feeding behavior of fish is highly dependent upon a number of variables such as the time of year, time of day, water temperature, and the amount of sunlight, to name a few. Depending upon the particular fish that the fisherman is endeavoring to catch, any one or a combination of any of the above variables may effect the location under the water's surface at which the fish will be most inclined to feed. Since it is often impossible to predict with any precision the depth that the fish are feeding on any particular day without experimenting first with different lures, the fisherman is often compelled out of necessity to bring on the excursion many different lures designed to operate at different water depths in the hope of finding that one lure which the fish will respond to.

Given the impracticality and inconvenience of having to bring many different lures, necessitating trial-and-error techniques, each trial of which requires cutting and re-attaching the fishing line, to find the lure that works, fishermen have long strived to provide a single lure with multiple-depth capability. Responsive thereto, a variety of adjustable-depth fishing lures have been developed in an attempt to solve the aforementioned problems. For example, U.S. Pat. No. 3,973,350 issued to England discloses an adjustable-depth fishing lure in which a hydrostatic pressure-sensitive rotary piston assembly is used to manually adjust the pitch of the lateral fins, and then to level the fins when the desired depth, corresponding to a particular water pressure, has been achieved. Although this lure may be adequate for its intended use, the fact that the means to adjust the depth is located partially outside the body may make it susceptible to accidental changing of the pitch setting due to fish strikes, snags, or underwater debris.

Figures 1A, 1B, 2, 3, 4:
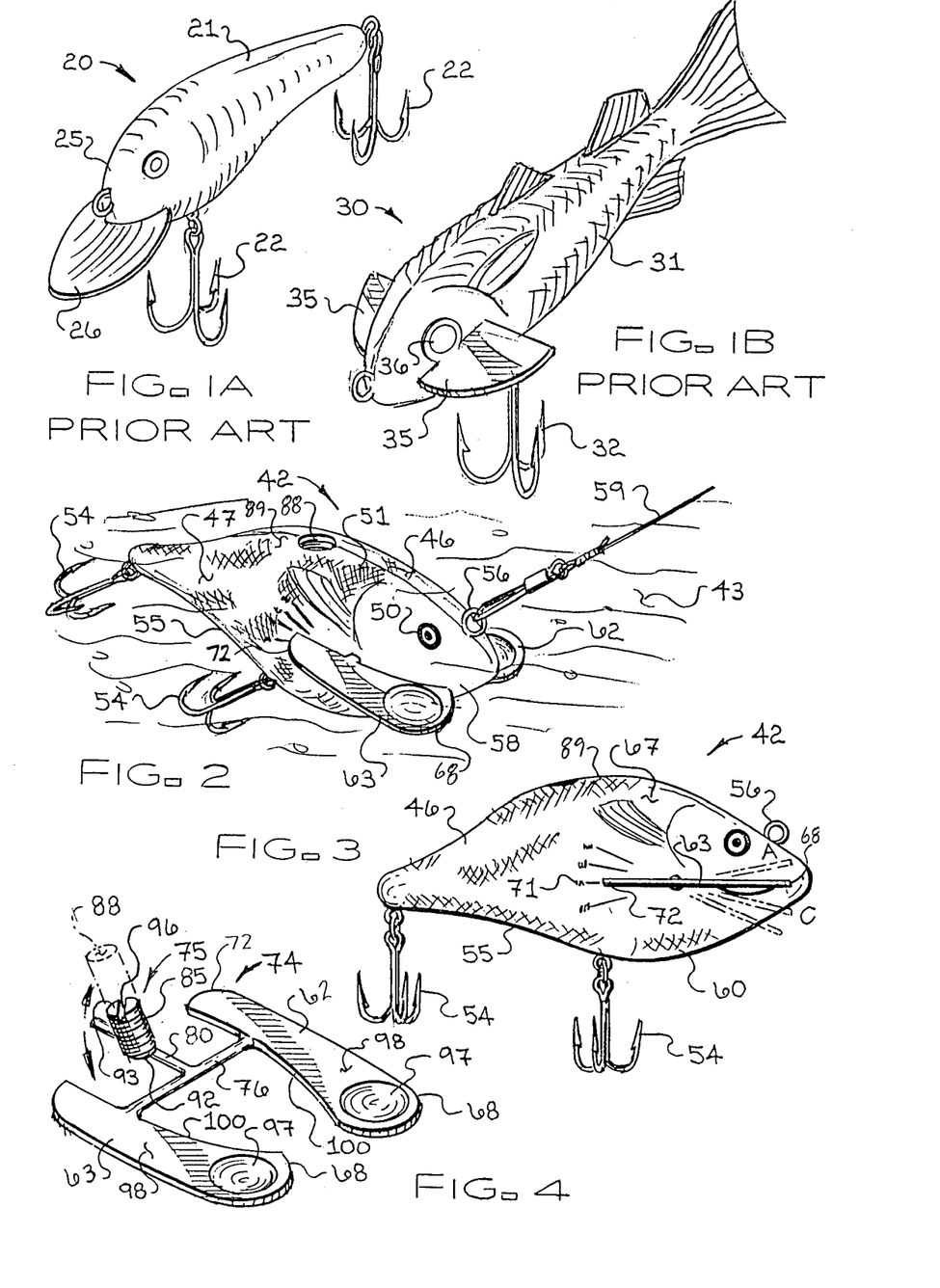
FIG. 1A is a perspective view of a typical prior art crankbait-type fishing lure of the type provided with a forward bib for use in allowing the bait to ride at a set water depth.
FIG. 1B is a perspective view of another typical prior art fishing lure in which rotatable lateral fins are provided on each side of the lure body.
FIG. 2 is a perspective view of a preferred embodiment of the adjustable-depth crankbait fishing lure of this invention as used in its operating environment.
FIG. 3 is a side view of the preferred embodiment of this invention illustrating various user-selected pitch orientations of the lateral fins (in alternate detail) and corresponding depth-selection indicia for each chosen pitch orientation.
FIG. 4 is a perspective view illustrating the pitch control mechanism for use with the preferred embodiment of this invention.

Another example of a prior art method for providing adjustable depth capability to a lure is illustrated and described with respect to FIG. 1B of applicant's disclosure. This lure comprises a substantially rubber body on which are mounted two adjustable fins coupled together by a rattle chamber passing transversely through, and frictionally held by, the lure body. Though this lure may also be adequate for its intended purpose, it also is susceptible to accidental changes in pitch setting since the means to control this setting (e.g., the fins) are located external to the body. In addition, the fact that the lure body is made of rubber may shorten its useable life span and possibly degrade the frictional cooperation between the rattle chamber and body, especially if used in salt-water, thus making more difficult the maintaining of the pitch setting. Thus, none of the prior art referred to herein will accomplish the purpose of the present invention.

A primary object of the present invention is to fulfill the above-mentioned need by the provision of an adjustable-depth crankbait fishing lure. A further primary object of the present invention is to provide such a fishing lure which is efficient, inexpensive, easy to use, and easy to manufacture. In addition, it is a primary object and feature of the present invention to provide such a fishing lure which is less prone to an accidental changing of the depth selection due to a fish strike or snagging of the lure on underwater debris. Another object and feature of this invention is to provide more generally a system for turning one shaft through part of a rotation when another parallel shaft turns part of a rotation in the same direction of rotation. More specifically, it is an object and feature of this invention to provide such a system wherein the position of both shafts can be easily changed by manually turning one shaft, but incidental forces on the other shaft will not change the positions of the shafts. Other objects and features of this invention will become apparent with reference to the following invention descriptions.

SUMMARY OF THE INVENTION

According to a preferred embodiment of the present invention, this invention provides an adjustable-depth fishing lure, of the type used with a fishing line, for use in catching fish at user-selected water depths, comprising in combination: a buoyant substantially rigid body having a first side, a second side, and two artificial eyes; a diving means located adjacent such first side and such second side of such body, for assisting in forcing such body under the water's surface; an adjustable-depth means, coupled to such diving means for adjustably setting the traveling depth of the fishing lure; a hooking means for hooking the fish; an attachment means for attaching the fishing lure to the fishing line; and a guard means for preventing accidental changing of such adjustable-depth means. Further, it provides such a fishing lure wherein such diving means comprises a first lateral fin and a second lateral fin, as well as such a fishing lure wherein such first lateral fin and such second lateral fin each comprises an elongated member having a top surface and a convex leading edge. In addition, this invention provides the fishing lure described above wherein each such top surface adjacent such leading edge comprises a substantially-circular indentation having an apex extending for a distance of about ⅛ inch from a plane of such top surface. It also provides such a fishing lure wherein such guard means comprises an internal cavity within such body structured and arranged to substantially enclose such adjustable-depth means, and such a fishing lure wherein such body comprises a substantially wood material. This invention further provides such a fishing lure wherein such hooking means comprises a plurality of fish hooks.

In addition, this invention provides an adjustable-depth fishing lure, of the type used with a fishing line, for use in catching fish at user-selected water depths, comprising in combination: a buoyant substantially rigid body having a first side, a second side, and an internal cavity; a diving means, located adjacent such first side and such second side of such body, for assisting in forcing such body under the water's surface; an adjustable-depth means, coupled to such diving means, for adjustably setting the traveling depth of the fishing lure, wherein such adjustable-depth means comprises: a rotatable shaft extending through a transverse first opening in such body, such shaft being attached to such diving means, a first arm, attached to and extending substantially perpendicularly from such shaft, such first arm being structured and arranged for pivoting rotationally within such cavity, and a blocker means, attached to such body, for selectively limiting rotation of such first arm; a hooking means for hooking the fish; an attachment means for attaching the fishing lure to the fishing line; and a guard means for preventing accidental changing of such adjustable-depth means. Further, this invention provides such a fishing lure wherein such blocker means comprises: an elongated first rotatable member extending transversely through a second opening in such body; and a second arm attached to and extending substantially perpendicularly from such first rotatable member, such second arm being structured and arranged for pivoting rotationally within such cavity; wherein such second arm is structured and arranged to engage such first arm. It also provides the fishing lure just described wherein such blocker means is user-adjustable in such manner that a user may adjustably limit such pivoting of such first arm upon manipulating such first rotatable member, and also such a fishing lure further comprising artificial eyes wherein such artificial eyes substantially comprise such first rotatable member.

In addition, this invention provides this fishing lure wherein such blocker means comprises an elongated second rotatable member extending into such body, such second rotatable member having a first end structured and arranged to engage such first arm. It also provides such a fishing lure wherein such second rotatable member comprises a threaded outer surface structured and arranged to frictionally engage a threaded third opening in such body. Furthermore, this invention provides such a fishing lure wherein such blocker means is user-adjustable in such manner that a user may adjustably limit such pivoting of such first arm upon manipulating such second rotatable member.

In addition to the above, this invention provides an adjustable-depth fishing lure, for use in catching fish, of the type used with a fishing line, comprising, in combination: a buoyant substantially wood body having a substantially closed internal cavity and having a first opening extending substantially transversely through such body, such body having a first side and a second side; a rotatable shaft extending through such first opening; a first lateral fin attached to such shaft adjacent such first side of such body; a second lateral fin attached to such shaft adjacent such second side of such body; a first arm, attached to and extending substantially perpendicularly from such shaft, such first arm being structured and arranged for pivoting rotationally within such cavity; a blocker means, attached to such body, for selectively limiting rotation of such first arm; a hooking means for hooking the fish; and an attachment means for attaching the fishing lure to the fishing line. It also provides this fishing lure wherein such first lateral fin and such second lateral fin each comprises an elongated member, each such elongated member having a top surface and a convex leading edge; and wherein each such leading edge comprises a substantially circular indentation having an apex extending for a distance of about ⅛ inch from such top surface. This invention also provides such a fishing lure wherein such body comprises a transverse second opening, and such blocker means comprises: an elongated first rotatable member extending transversely through such second opening in such body; and a second arm attached to and extending substantially perpendicularly from such first rotatable member, such second arm being structured and arranged for pivoting rotationally within such cavity; wherein such second arm is structured and arranged to engage such first arm. It further provides such a fishing lure wherein an outer surface of such body comprises a plurality of depth-selection markers adjacent an end of such first rotatable member. It even further provides such a fishing lure wherein an outer surface of such body comprises a plurality of depth-selection markers adjacent either such first lateral fin or such second lateral fin. It also provides this fishing lure wherein such blocker means comprises an elongated second rotatable member extending into such body, such member having a first end structured and arranged to engage such first arm. Even further still, this invention provides such a fishing lure wherein such second rotatable member comprises a threaded outer surface structured and arranged to engage a threaded aperture in such body; and it also provides such a fishing lure wherein such body is provided with a plurality of depth-selection markers adjacent at least one such lateral fin.

Additionally still, this invention provides an adjustable-depth fishing lure, of the type used with a fishing line, for use in catching fish at user-selected water depths, comprising, in combination: a body having a first side, a second side, an internal cavity, and a traverse first opening, wherein such body is structured and arranged to attach to a hook and to a fishing line; two parallel fins on a common shaft wherein such shaft passes through such first opening in such body, one such fin is located adjacent to such first side of such body, and one such fin is located adjacent to such second side of such body; and a fin pitch control mechanism wherein such pitch control mechanism further comprises a first arm attached to, and substantially perpendicular to, such shaft wherein such arm is located within such internal cavity of such body. It also provides such a fishing lure wherein: such body further comprises a second opening; such pitch control mechanism further comprises a rotatable member, wherein such rotatable member is located in such second opening of such body, and such rotatable member is structured and arranged to be manually rotated with a screwdriver. Not only that, but it also provides such a fishing lure further comprising a friction fit between such rotatable member and such body; and also such a fishing lure further comprising depth-selection markers. This invention further provides such a fishing lure wherein: such second opening is substantially parallel to such first opening; such pitch control mechanism further comprises a second arm attached to, and perpendicular to, such rotatable member; and such second arm contacts, and influences the location of, such first arm. It also provides such a fishing lure wherein such depth-selection markers are located adjacent to such second opening in such body. Furthermore, it provides such a fishing lure wherein such pitch control mechanism further comprises a slidable-engagement member attached to such second arm, wherein such first arm slidably passes through such slidable-engagement member.

In addition to all of the above, this invention further provides a system for rotating a shaft through part of a rotation when another parallel shaft rotates through part of a rotation in the same direction comprising in combination: a second shaft rotatably mounted in at least one second bushing; a second arm attached substantially perpendicularly to such second shaft; an slidable-engagement member, wherein such slidable-engagement member is attached to such second arm; a first shaft, rotatably mounted in at least one first bushing, wherein such first shaft is held substantially parallel to such second shaft; and a first arm, wherein such first arm is attached substantially perpendicularly to such first shaft, and such first arm slidably passes through such slidable-engagement member. It also provides this system further comprising a friction fit between such second shaft and at least one such second bushing; and also this system wherein such first arm is curved. Not only that, but it also provides such a system wherein such first arm has a gradually varying cross section and such first arm is thicker in the middle, in at least one dimension, than at the ends. This invention also provides such a system further comprising a pivot where such second arm attaches to such slidable-engagement member; as well as such a system further comprising at lest two such second bushings and at least two such first bushings. Finally, this invention also provides such a system further comprising a friction fit between such second shaft and at least one such second bushing, wherein such system is located inside an adjustable-depth fishing lure, of the type used with a fishing line, for use in catching fish at user-selected water depths, wherein such fishing lure comprises in combination: a body, wherein such body is structured and arranged to attach to a hook and to a fishing line, and such body is structured and arranged to support such second bushings and such first bushings, and house such system; and two fins wherein such fins are located adjacent to such body, and such fins are attached to such first shaft; wherein such second shaft is structured and arranged to be rotated to adjust the pitch of such fins.

A further embodiment of the invention is a fishing lure, which consists of a body with first and second opposed sides, a first member rotatably carried by the body and having first and second end portions disposed adjacent the respective sides of the body, a fin carried by each of the terminal end portions of the first member, a second member rotatably carried by the body, and means interacting between the first member and the second member, whereby rotation of the second member urges corresponding rotation of the first member. In one embodiment, the means the means interacting between the first member and the second member comprises an arm of one of the first member and the second member and an end of the other of the first member and the second member interacting with the arm. In another embodiment, the means interacting between the first member and the second member is a gear assembly. The gear assembly includes a first gear carried by the first member meshingly engaged to a second gear carried by the second member. At least one hook is supported by the body for hooking a fish. The body also supports at least one eyelet.

In a fishing lure having a body with first and second opposed sides, the invention provides a mechanism therein for selectively adjusting the running depth of said lure including a first member rotatably carried by the body and having first and second end portions disposed adjacent the respective sides of the body, a fin carried by each of the terminal end portions of the first member, a second member rotatably carried by the body, and means interacting between the first member and the second member, whereby rotation of the second member urges corresponding rotation of the first member. In one embodiment, the means the means interacting between the first member and the second member comprises an arm of one of the first member and the second member and an end of the other of the first member and the second member interacting with the arm. In another embodiment, the means interacting between the first member and the second member is a gear assembly. The gear assembly includes a first gear carried by the first member meshingly engaged to a second gear carried by the second member. At least one hook is supported by the body for hooking a fish. The body also supports at least one eyelet.

BRIEF DESCRIPTION OF THE DRAWINGS

Referring to the drawings.

DETAILED DESCRIPTION OF PREFERRED EMBODIMENTS

Referring now to the Figures, shown in perspective in FIGS. 1A and 1B are two typical prior art methods of providing a fishing lure with the capability of traveling a different depths below the surface of a body of water 43 (shown in FIG. 2). Shown in FIG. 1A is a typical crankbait-type lure 20 having a buoyant lure body 21 on which is attached a plurality of fish hooks 22. Attached to the leading portion 25 of lure body 21 is a bib 26 which is structured and arranged to simulate an airfoil. In operation, as the lure 20 is being pulled through the water 43 (shown in FIG. 2), water 43 impinges upon bib 26 thereby creating a pressure gradient with the greatest pressure being observed at the portion of the bib 26 being directly impacted by the water 43. As the speed of pull increases, a point is reached in which the water pressure acting on the bib 26 overcomes the buoyant force of the lure body 21 and the lure 20 is forced under the water's (43's) surface. As is well known by those skilled in the fluid dynamic arts, one factor which affects the depth at which the lure 20 will dive beneath the water's surface is the magnitude of the force of the water 43 (shown in FIG. 2) impinging upon the bib 26. The magnitude of this water pressure or force, in turn, is also dependent on a number of variables which, to name a few, include the speed in which the lure 20 is moved through the water 43, surface area of the bib 26, and the angle of attack of the bib 26 (e.g., the degree of downward pitch of the bib 26 from horizontal). It follows that by providing the lure 20 shown in FIG. 1A with a bib 26 having a fixed size and angle of attack, the lure 20 will only be capable of traveling at a single depth below the water's 43 surface. In order to reach fish located at other depths, other lures 20 with different configurations would have to be used.

Another typical prior art fishing lure 30 having adjustable depth capability is as shown in FIG. 1B. This type of lure 30 is typically provided with a rubber lure body 31 having a fish hook 32 attached thereto. Adjustable depth capability is provided by a pair of rotatable lateral fins 35 which are integrally attached to a rattle chamber 36. The rattle chamber 36, in turn, is structured and arranged to be received by a chamber aperture which passes transversely through lure body 31 (not shown). Providing the fishing lure 30 with depth adjustment capability consists of manually turning one of the fins 35 until the fins 35 are at the desired downward pitch. The adjustment of the fins 35 is maintained by the frictional cooperation between the rattle chamber 36 and chamber aperture (not shown). In view of the fact that the means to adjust the pitch setting is the fins 35 themselves, such an arrangement may be susceptible to inadvertent pitch changes due to underwater snags or debris. In addition, the fact that the lure body 31 is made of a soft rubber material may result in a degradation of the frictional cooperation between the lure body 31 and rattle chamber 36 over time, especially if the fishing lure 30 is used in salt-water. As will be appreciated by those skilled in such art as this disclosure progresses, the present invention is designed in such a manner as to alleviate the aforementioned shortcomings which plague the prior art attempts to provide an efficient adjustable-depth fishing lure.

Referring now to a preferred embodiment of this invention, FIGS. 2 and 3, respectively, are a perspective view and side view of a preferred embodiment of the adjustable-depth crankbait fishing lure designated hereinafter by reference numeral 42. Shown in FIG. 2 is the crankbait fishing lure 42 in use in its working water 43 environment. The crankbait fishing lure 42 comprises a lure body 46 which is preferably constructed from a buoyant yet hard, durable and substantially rigid material, most preferably wood. It has been found that by providing the crankbait fishing lure 42 with a substantially rigid lure body 46, those lure components described hereinafter which are required to be maintained in a set position by a tight fit cooperation with the lure body 46 may maintain that tight fit over longer periods of time, as opposed to softer lure bodies made of rubber or the like, without appreciable degradation in the aforementioned fit. To make the crankbait fishing lure 42 more appealing to large fish, the outer surface 47 of lure body 46 is preferably adorned with, by painting or other like method, fish-like characteristics such as artificial eyes 50 and fish scales 51. In addition, lure body 46 preferably has the overall shape of a fish, including a substantially pointed nose, a rounded mid-body, and a substantially elongated tail (as shown in FIG. 2). Also shown are a plurality of fish hooks 54 (embodying herein a hooking means for hooking the fish) attached to the underside 55 of lure body 46, which are structured and arranged to hook fish. Also shown is an attachment ring 56 [embodying herein an attachment means for attaching the fishing lure (crankbait fishing lure 42) to the fishing line 59], attached to the forward portion 58 of lure body 46, for coupling the crankbait fishing lure 42 to a fishing line 59. Although an attachment ring 56 is shown, and is preferred, other features (attachment features) that could be used to attach a fishing line 59 would also work, such as an appropriately located hole (not shown) through the lure body 46, or one or more protrusions (not shown) that fishing line 59 could be tied around. As shown best in FIG. 3, the underside 55 of lure body 46 is provided with a substantially rounded keel portion 60 which is structured and arranged to maintain the crankbait fishing lure 42 in a stable upright position when being pulled through the water 43.

Figures 5, 6, 7:
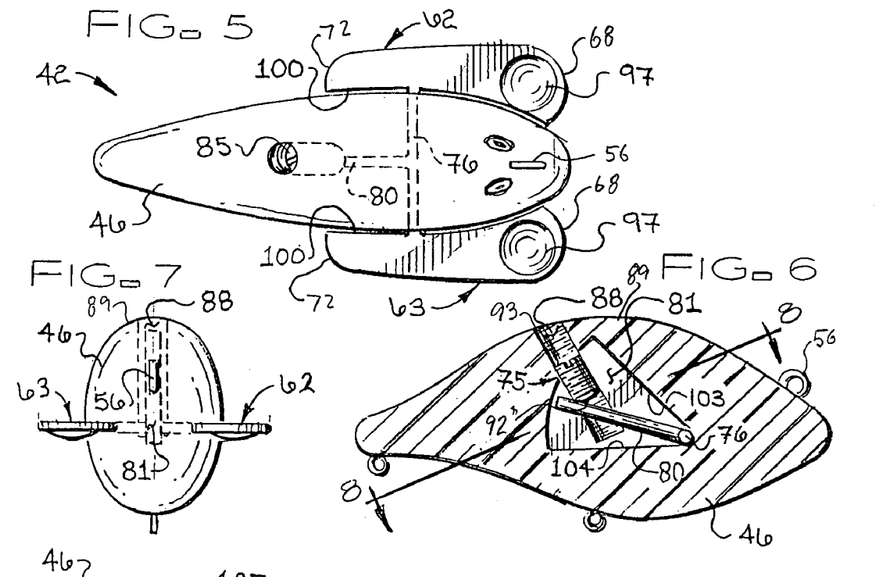
FIG. 5 is a top view of the preferred embodiment of this invention.
FIG. 6 is a side view, in cross-section, illustrating the arrangement of the pitch control mechanism of FIG. 4 within the body cavity.
FIG. 7 is a front view of the preferred embodiment of this invention.

To provide the crankbait fishing lure 42 with diving capability, a pair of pivotable fins comprising an elongated lateral left fin 62 and an elongated lateral right fin 63 are provided, respectively, on the left side 64 and right side 67 of the lure body 46 (as shown best in FIG. 5). The fins 62 and 63 embody herein a diving means, located adjacent such first side (left side 64) and such second side (right side 67) of such body (lure body 46), for assisting in forcing such body (lure body 46) under the water's (water 43) surface. Although the specific details regarding a preferred means to adjust the pitch of the fins 62 and 63 will be discussed more fully with respect to FIG. 4, it is noted for now that the crankbait fishing lure 42 is structured and arranged to allow the user to manually select a desired pitch of fins 62 and 63 corresponding to a preferred dive depth.

With reference now to FIG. 3, shown is the right side 67 of lure body 46 with the corresponding right fin 63 positioned in an approximately horizontal orientation. Although the following discussion regarding fin pitch may at times only make reference to right fin 63, it is to be understood that fins 62 and 63 are preferably dependently coupled, and any change in pitch orientation of the right fin 63 will preferably result in a substantially identical adjustment of left fin 62. Shown in alternate detail are various pitch orientations that are possible for fins 62 and 63. As should be apparent to those skilled in such art, when the leading edge 68 of right fin 63 is substantially at or above a horizontal position (e.g., position A), water 43 is preferably substantially prevented from impacting the leading edge 68 resulting in the crankbait fishing lure 42 being maintained at the water's surface when being pulled. Conversely, adjusting fins 62 and 63 so that leading edge 68 is below horizontal (e.g., position C) preferably causes an aforementioned pressure gradient across fins 62 and 63 thereby forcing the crankbait fishing lure 42 to submerge. As discussed previously with respect to FIGS. 1A and 1B, increasing the downward pitch of the fins 62 and 63 creates a greater pressure gradient and, hence, a greater dive depth. It is preferred that each leading edge 68 have a convex shape, as shown, so as to provide the crankbait fishing lure 42 with a more streamlined shape and aerodynamic action under the water's surface. To assist the user in selecting a fin pitch that will correlate to a desired fishing depth, calibrated depth-selection markers 71 are preferably provided on the lure body 46 adjacent to the trailing edge 72 of right fin 63. As shown best in FIG. 3, the depth-selection markers 71 preferably comprise elongated markers which, when aligned with the longitudinal axis of right fin 63, preferably indicate the approximate depth in which the crankbait fishing lure 42 will dive at that specific setting.

Shown in FIG. 4 are the fin assembly 74 and a pitch control mechanism 75 for use with the preferred embodiment of this invention (crankbait fishing lure 42). The fin assembly 74 preferably comprises the left and right fins 62 and 63 connected by a shaft 76 which is preferably structured and arranged to be received by a first opening 77 (as shown best in FIG. 8) extending preferably substantially transversely through lure body 46. Shaft 76 herein embodies a rotatable shaft (or rotatable member) extending through a transverse first opening (77) in such body (lure body 46), such shaft (76) being attached to such diving means. Also preferably included in the fin assembly 74 is a first arm 80, attached preferably substantially midway along shaft 76, having a preferred length of approximately 1¼ inches and preferred diameter of approximately 1/16 inch, which is preferably structured and arranged for pivotable movement (about the rotational axis of shaft 76) within a cavity 81 (as shown best in FIG. 6) provided within the lure body 46. The fins 62 and 63, shaft 76, and first arm 80 may be formed as a unit from a suitable durable material, preferably plastic-type material. Alternatively, the shaft 76 and first arm 80 may made of a metallic-type material and firmly attached, in well known ways, to the preferably plastic fins 62 and 63. A preferred method of incorporating the shaft 76 and first arm 80 into the lure body 46 is by bifurcating the lure body 46 into two portions with line of separation passing longitudinally through the first opening 77. In this way, the shaft 76 and first arm 80 may be quickly and easily added to the lure body 46 and the bifurcated lure body 46 portions reattached, in well-known ways. The pitch control mechanism 75 for use with the preferred embodiment of this invention preferably comprises a second rotatable member or fastener 85, preferably a threaded fastener, which is preferably structured and arranged to frictionally engage a corresponding threaded aperture 88 (as shown best in FIG. 6) provided in the top portion 89 of lure body 46. In other words, fastener 85 preferably has a threaded outer surface structured and arranged to frictionally engage (engage with a friction fit as described below) a threaded opening (aperture 88) in lure body 46. In operation, decreasing the downward fin pitch is accomplished by manually turning fastener 85 in such a manner as to cause the fastener 85 bottom end 92 to contact first arm 80. Fastener 85 preferably has a first end which is structured and arranged to engage first arm 80. In other words, as fastener 85 is screwed into threaded aperture 88, the end of fastener 85 preferably impacts and pushes on first arm 80. Further such turns of fastener 85 preferably cause the first arm 80 to pivot downward, which, in turn, causes the leading edges 68 of fins 62 and 63 to rotate upwards. Conversely, opposite-direction such turns of fastener 85 preferably allows the first arm 80 to pivot upwards which, in turn, allows for a greater downward fin pitch when the leading edges 68 are impacted by water 43. Stated in other terms, as embodied herein, pitch control mechanism 75 is structured and arranged so that rotation of the rotatable member (fastener 85) effects a rotation of shaft 76. To facilitate turning of the fastener 85, the fastener 85 top end 93 is provided with a groove 96 sized and arranged to receive the flat edge of a screwdriver or other like device.

Fastener 85 has a friction fit within threaded aperture 88. A friction fit, as used herein for all embodiments of the present invention, is where sufficient friction exists between the parts (e.g. between fastener 85 and threaded aperture 88) to prevent their unintentional relative motion. In other words, there is enough friction between the parts (e.g. fastener 85 and threaded aperture 88) that the internal part (e.g. fastener 85) does not turn except when a user turns it with a screwdriver. A friction fit is preferably accomplished by a slight interference fit.

As used herein, a blocker is a part or device that blocks the motion of a second part, preferably such that the location at which the motion of the second part is stopped is adjustable. Thus, fastener 85 embodies herein a blocker, mounted in said body (lure body 46), wherein such blocker is structured and arranged to selectively limit rotation of said first arm 80. In addition, fastener 85 embodies herein a blocker means, attached to said body (lure body 46), for selectively limiting rotation of said first arm 80. The above arrangement embodies herein an arrangement wherein such blocker means is user-adjustable in such manner that a user may adjustably limit such pivoting of such first arm 80 upon manipulating such second rotatable member (fastener 85). Furthermore, the first arm 80, the shaft 76, and the pitch control mechanism 75 embodies herein an adjustable-depth means, coupled to such diving means, for adjustably setting the traveling depth of crankbait fishing lure 42. In addition, the first arm 80, the shaft 76, and the blocker means described herein embodies herein an adjustable-depth means.

Referring further to FIG. 4, to provide the crankbait fishing lure 42 with an even greater dive depth capability, those portions of the fins 62 and 63 adjacent the leading edges 68 are preferably provided with substantially round (circular) indentations 97, preferably having a maximum apex depth from each fin top surface 98 of about ⅛ inch. With reference to the aforementioned discussion accompanying FIGS. 1A and 1B, as water 43 (shown in FIG. 2) impacts the leading edges 68, the water 43 will have a tendency to stagnate within these indentations 97 instead of smoothly flowing over the top surface 98 of the fins 62 and 63. With the assumption that the other dive depth variables are held constant, by stagnating the water 43 flow in such a manner, the water pressure acting upon the leading edges 68 is effectively increased thereby allowing the crankbait fishing lure 42 to achieve even greater dive depths. In addition, to make the crankbait fishing lure 42 more aerodynamic as it travels under the water's surface, each inner side edge 100 of fins 62 and 63 is preferably structured and arranged to substantially match the contours of the lure body 46, as shown in FIG. 5.

Shown in FIGS. 5–8 are a variety of views illustrating the preferred arrangement of the cavity 81, threaded aperture 88, and pitch control mechanism 75 of crankbait fishing lure 42. Referring to, respectively, the plan view of FIG. 5 and the front view of FIG. 7, to provide a substantially balanced crankbait fishing lure 42, it is preferred that both the fastener 85 and first arm 80 be structured and arranged to lie substantially along the longitudinal axis of the lure body 46. Shown in cross-section in FIG. 6 are the pitch control mechanism 75 and those portions of the fin assembly 74 comprising the first arm 80 and shaft 76 as installed within the lure body 46. As discussed previously, the first arm 80 is preferably structured and arranged for pivotable movement within cavity 81. The cavity 81, in turn, preferably comprises a substantially wedged-shape cavity, substantially enclosed within lure body 46 (as shown), having a width sufficient to allow for unobstructed movement of the first arm 80 therein. With reference to the above discussion, it can be seen for all embodiments disclosed herein that the cavity 81 embodies herein a guard means for preventing accidental changing of such adjustable-depth means; and wherein such guard means comprises an internal cavity (81) within such body (lure body 46) structured and arranged to substantially enclose such adjustable-depth means.

Furthermore, it is preferred that the cavity 81 be formed such that the included angle between the cavity 81 top edge 103 and the cavity 81 bottom edge 104 be of sufficient size to allow to crankbait fishing lure 42 to ride at the water's surface when the first arm 80 lies adjacent the cavity 81 bottom edge 104, and allows it to dive in a controlled manner to its maximum depth when the first arm 80 lies adjacent to the cavity 81 top edge 103.

Figures 8, 9, 10, 11:
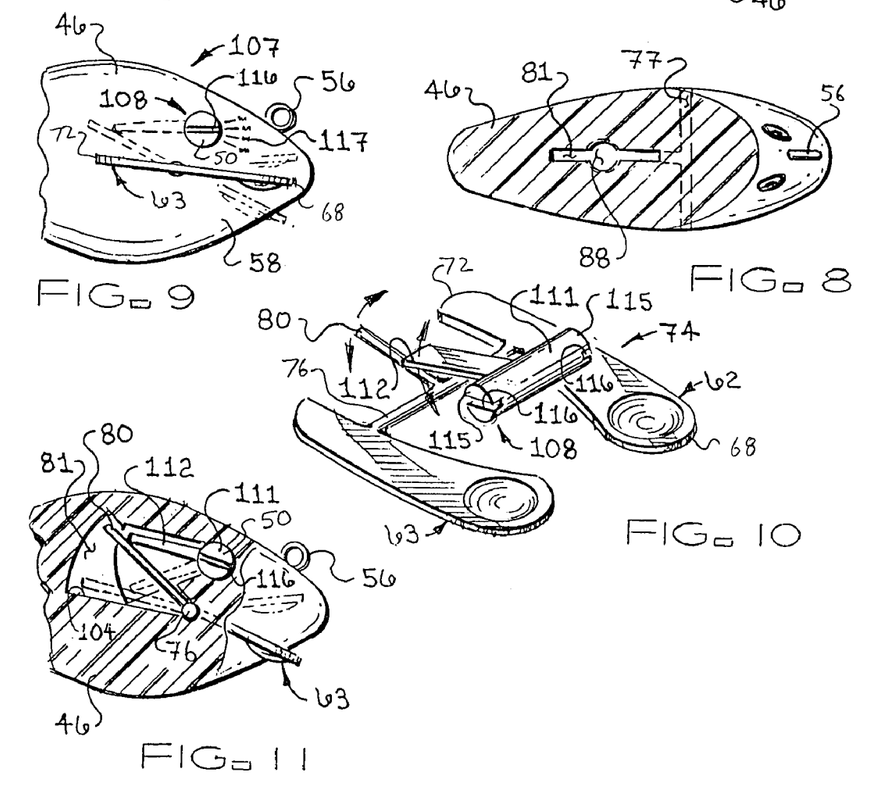
FIG. 8 is a cross-sectional view, taken from section lines 8—8 in FIG. 6, illustrating the relative dimensions of the body cavity.
FIG. 9 is a side view of an alternate preferred embodiment of the adjustable-depth crankbait fishing lure of this invention.
FIG. 10 is a perspective view illustrating the pitch control mechanism for use with the alternate preferred embodiment of this invention.
FIG. 11 is a partial side view, in partial cross-section, illustrating the arrangement of the pitch control mechanism of FIG. 10 within the body cavity.

Shown in FIG. 8 is a plan view, in cross-section, taken along a plane substantially perpendicular to the longitudinal direction of the threaded aperture 88. As shown, it is preferred that the threaded aperture 88 have a diameter slightly larger than the width of the cavity 81. Sizing the threaded aperture 88 in such a manner allows the fastener 85 to have a sufficiently short overall length, thereby allowing it to always remain imbedded in, and thus protected by, the lure body 46 regardless of whether the fins 62 and 63 are set for maximum upward or downward pitch. As will be appreciated by those skilled in such art, by always maintaining the fastener 85 imbedded in the lure body 46, any accidental changing of the pitch setting due to fish strikes, snags, or other like underwater menaces may be avoided. This arrangement also embodies herein a guard means for preventing accidental changing of such adjustable-depth means. In addition, the present invention also includes another useful and important feature in that the pitch control mechanism 75 preferably operates as a positive-stop allowing the first arm 80 to freely rotate between the fastener 85 bottom end 92 and cavity 81 bottom edge 104 when the crankbait fishing lure 42 is set to dive. As will also be appreciated by those skilled in such art, this positive-stop feature preferably allows the fins 62 and 63 to return to the original pitch setting after being disturbed by fish strikes or snags without necessitating the need to re-set the pitch control mechanism 75. Also, as shown in FIG. 6, it is preferred that the threaded aperture 88 extend to a sufficient depth within the lure body 46 so as to effectively pin the first arm 80 against the cavity 81 bottom edge 104, thereby preventing downward rotation of the fins 62 and 63 when the crankbait fishing lure 42 is configured for water 43 surface operation.

Shown in FIGS. 9–11 is an alternate preferred embodiment of the crankbait fishing lure designed herein by reference numeral 107. The crankbait fishing lure 107 of the present embodiment preferably comprises a lure body 46, attachment ring 56, fish hooks 54, and fin assembly 74 all as substantially illustrated and described previously. Adjusting the pitch of the fins 62 and 63 is preferably accomplished by means of the pitch control mechanism 108 of the present embodiment which is preferably pivotally attached to lure body 46. As shown in FIG. 10, the pitch control mechanism 108 preferably comprises a first rotatable member or elongated shaft 111 having a second arm 112 attached substantially midway thereon. Shaft 111 herein embodies an elongated first rotatable member extending transversely through the second opening in the body (lure body 46). Shaft 111 is preferably substantially parallel to shaft 76 as shown, and preferably has a friction fit (as described above for crankbait fishing lure 42) in body 46. This friction fit is preferably accomplished by a slight interference fit, and is selected to result in enough friction to prevent shaft 111 from turning on its own, but is not so great so as to prevent shaft 111 from being easily turned with a screwdriver. This interference fit is preferably between shaft 111 and lure body 46, but may also be between shaft 111 and one or more bushings (not shown) in lure body 46. Second arm 112 is preferably attached to and preferably extends substantially perpendicularly from the first rotatable member (shaft 111). Second arm 112 is preferably structured and arranged for pivoting rotationally within cavity 81, wherein second arm 112 is structured and arranged to engage first arm 80 and block its movement as described in more detail below. In other words, second arm 112 preferably contacts, and influences the location of, shaft 111. Stated in other terms, as embodied herein, pitch control mechanism 108 is preferably structured and arranged so that rotation of the rotatable member (shaft 111) effects a rotation of shaft 76. Pitch control mechanism 108 embodies herein a blocker, mounted in said body (lure body 46), wherein such blocker is structured and arranged to selectively limit rotation of said first arm 80.

It is preferred that both the shaft 111 and the second arm 112 be made of a metallic material, though other materials such as plastic may also be used. The shaft 111 is preferably structured and arranged for frictional engagement (a friction fit) with a second opening (not shown) preferably passing substantially transversely through the forward portion 58 of lure body 46. When the shaft 111 is positioned as shown, the shaft ends 115 preferably also function as the artificial eyes 50 (as shown in FIGS. 9 and 11). To prevent underwater debris or other such underwater objects from snagging or striking the shaft 111 and thereby inadvertently changing the pitch adjustment, it is preferred that the shaft 111 be sized and positioned such that the ends 115 are either flush with the outer surface 47 of lure body 46, or slightly receded into the lure body 46. In addition, second arm 112 is protected from inadvertent contact and adjustment by cavity 81 in body 46. This arrangement also embodies herein a guard means for preventing accidental changing of such adjustable-depth means. As shown in partial cross-section in FIG. 10, the cavity 81 illustrated and described previously is modified to incorporate the pivotable movement of the second arm 112 which, in turn, is preferably structured and arranged to engage first arm 80. To ensure engagement between the first and second arms 80 and 112, the second arm 112 preferably comprises a substantially planar member having a width larger than the diameter of the first arm 80.

Adjusting the pitch of fins 62 and 63 so as to cause the crankbait fishing lure 107 to dive preferably consists of simply turning shaft 111 counterclockwise whereby the second arm 112 engages the first arm 80. Subsequent such turns preferably forces the first arm 80 to rotate towards the cavity 81 bottom edge 104 causing a corresponding upwards rotation of the leading edges 68 of fins 62 and 63. Conversely, a clockwise rotation of shaft 111 preferably allows the first arm 80 to pivot upwards, thereby resulting in a downward rotation of the leading edges 68 of fins 62 and 63. Thus, the pitch control mechanism 108 preferably embodies herein a blocker means, attached to such body (lure body 46), for selectively limiting rotation of such first arm 80. In addition, it can be seen that this arrangement embodies herein an arrangement wherein such blocker means preferably is user-adjustable in such manner that a user may adjustably limit such pivoting of such first arm 80 upon manipulating such first rotatable member (shaft 111). Furthermore, the pitch control mechanism 108, the shaft 76, and the first arm 80 embodies herein an adjustable-depth means, coupled to such diving means, for adjustably setting the traveling depth of the fishing lure (crankbait fishing lure 107). In addition, the first arm 80, the shaft 76, and the blocker means described herein embodies herein an adjustable-depth means. Furthermore, shaft 76 herein embodies a rotatable shaft extending through a transverse first opening in such body (lure body 46), such shaft being attached to such diving means.

As in the aforementioned preferred embodiment (crankbait fishing lure 42), the arrangement of the pitch control mechanism 108 described herein preferably also operates as a positive-stop, or blocker, allowing the first arm 80 to freely rotate between the cavity 81 bottom edge 104 and the second arm 112 when the crankbait fishing lure 107 is set to dive. Thus, if the pitch of the fins 62 and 63 is upset due by any impact caused by fish strikes or snags, the fins 62 and 63 will automatically return to their original pitch setting. To facilitate turning of the shaft 111, each of the shaft 111 ends 115 are preferably provided with a groove 116 sized and arranged to receive the flat edge of a screwdriver or other like device. To assist the user in selecting a fin pitch that will correlate to a desired fishing depth, calibrated depth-selection markers 117 are preferably provided on the lure body 46 adjacent to either one or both of the ends 115 of shaft 111, as shown in FIG. 9. Again referring to FIG. 9, the depth-selection markers 117 preferably comprise elongated markers which, when aligned with the longitudinal axis of groove 116, indicate the approximate depth in which the crankbait fishing lure 107 will dive at that specific setting.

Figure 12:
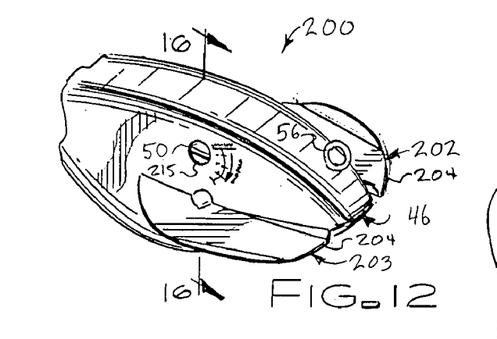
FIG. 12 is a perspective view of a third alternate preferred embodiment of the adjustable-depth crankbait fishing lure of this invention.
Figure 13:
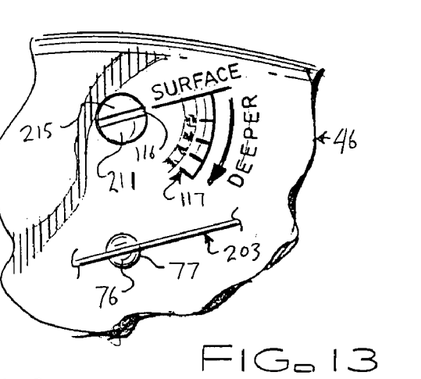
FIG. 13 is a partial side view illustrating the pitch control mechanism for use with the third alternate preferred embodiment of this invention.

Shown in FIGS. 12-16 is an alternate preferred embodiment of the crankbait fishing lure designed herein by reference numeral 200. FIG. 12 is a perspective view of crankbait fishing lure 200. FIG. 13 is a partial side view illustrating the pitch control mechanism 208 for use with crankbait fishing lure 200. As can be seen in these figures, alternate preferred embodiment of the present invention, crankbait fishing lure 200, preferably comprises left fin 202 and right fin 203 which are similar to fins 62 and 63 discussed above, except with a somewhat different preferred shape as shown best in FIG. 12. In addition, fins 202 and 203 are preferably held at one pitch rather than being free to move in one direction. Fins 202 and 203 are preferably parallel to each other, are preferably lateral fins, are preferably opposite-hand mirror images of each other, and are preferably concave upwards. The concave shape both increases the structural stiffness of fins 202 and 203, and increases their effectiveness at catching the water 43 and pushing crankbait fishing lure 200 deeper below the surface of the water 43. As shown, fins 202 and 203 are preferably elongated, and preferably have a convex leading edge 204. The fins 202 and 203 embody herein a diving means, located adjacent such first side and such second side of such body (lure body 46), for assisting in forcing such body (lure body 46) under the water's (water 43) surface. Crankbait fishing lure 200 also preferably has a shaft 211 (embodying a rotatable member herein) that is similar to shaft 111 described above for the alternate preferred embodiment of crankbait fishing lure 107. Specifically, shaft 211 herein embodies an elongated rotatable member extending transversely through the second opening in the body (lure body 46). In addition, shaft 211 is preferably substantially parallel to shaft 76, and preferably has a friction fit (as described above) in body 46 (or in a bushing located in body 46). As described for crankbait fishing lure 107 above, this friction fit is preferably accomplished by a slight interference fit, and is preferably selected to result in enough friction to prevent shaft 211 from turning on its own, but is not so great so as to prevent shaft 211 from being easily turned with a screwdriver. Crankbait fishing lure 200 also preferably has a substantially rigid lure body 46 (preferably made of wood), an attachment ring 56 (or other attachment feature as described above), and a shaft 76 through a first opening 77 as described above. The ends 215 of shaft 211 preferably serve as artificial eyes 50 so that crankbait fishing lure 200 resembles a small fish, thus functionally attracting the larger fish that feed on smaller fish. In addition, crankbait fishing lure 200 preferably has groove 116 and depth-selection markers 117, shown best in FIG. 13 and also described above for crankbait fishing lure 107.

Figure 14:
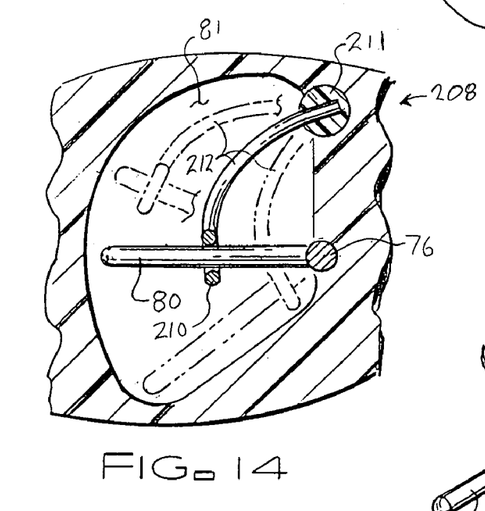
FIG. 14 is a partial sectional side view, illustrating the arrangement of the pitch control mechanism of FIG. 13 within the body cavity.

FIG. 14 is a partial sectional side view, illustrating the arrangement of the pitch control mechanism 208 of crankbait fishing lure 200 within the body cavity 81. As can be seen in FIG. 14, it is the pitch control mechanism 208 that most distinguishes crankbait fishing lure 200 from the other embodiments of the crankbait fishing lure previously described (42 and 107). Pitch control mechanism 208 is user-adjustable in such manner that a user may adjustably limit such pivoting of such first arm 80 upon manipulating such first rotatable member (shaft 211).

Figure 15:
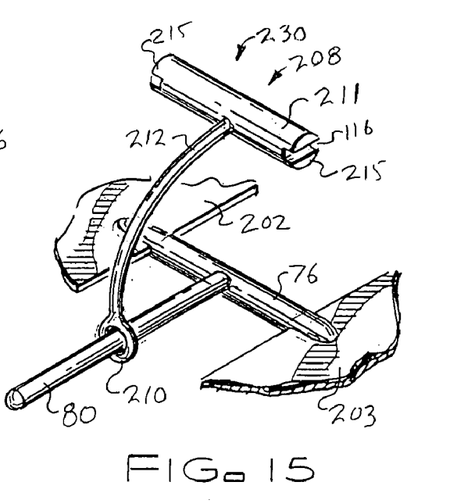
FIG. 15 is a partial perspective view, illustrating the arrangement of the pitch control mechanism of the third alternate preferred embodiment of this invention shown in FIGS. 13 and 14.
Figure 16:
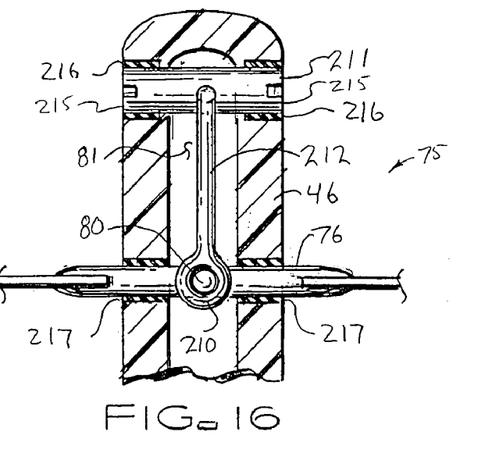
FIG. 16 is a partial sectional back view, illustrating the arrangement of the pitch control mechanism of FIGS. 13, 14, and 15 within the body cavity.

FIG. 15 is a partial perspective view, illustrating the arrangement of the pitch control mechanism 208 of FIGS. 13 and 14; and FIG. 16 is a partial sectional back view, illustrating the arrangement of the pitch control mechanism 208 of FIGS. 13, 14, and 15 within the body cavity 81. Pitch control mechanism 208 is a specific application of apparatus 230 applied to crankbait fishing lure 200. General applications of apparatus 230 will be described below. In addition to shafts 211 and 76 as discussed above, crankbait fishing lure 200 preferably has internal cavity 81 in lure body 46 that is preferably similar to cavity 81 described above, except preferably slightly wider to accommodate slidable-engagement member 210 (embodied herein as eyelet 210) Crankbait fishing lure preferably also has first arm 80 that is attached to shaft 76 and is preferably similar to first arm 80 described above, and second arm 212 that is attached to shaft 211 and is preferably similar to second arm 112 described above except for the differences that are apparent or as described herein. A notable difference is that on the end of second arm 212 is slidable-engagement member 210, through which first arm 80 slidably passes. Thus, in crankbait fishing lure 200, shaft 211 controls the position of shaft 76 in both directions of rotation (rather than blocking one direction of rotation). In other words, second arm 212 contacts, and influences the location of, first arm 80, in such a way that second arm 212 holds first arm 80 in place. Stated in other terms, as embodied herein, pitch control mechanism 208 is structured and arranged so that rotation of the rotatable member (shaft 211) effects a rotation of shaft 76. A preferred closed eyelet is shown, which is preferably forged or molded from metal or plastic; however, e.g., slidable-engagement member 210 may also be an eyelet formed by bending a piece of (preferably metal) wire or similar material into a full or partial loop, etc.

As shown in FIG. 16, shafts 211 and 76 of crankbait fishing lure 200 are preferably mounted in bushings 216 and 217 respectively. One function of bushings 216 and 217 is to provide friction to hold shafts 211 and 76 from rotating in lure body 46 once an adjustment is made. Preferably, most of this friction comes from a friction fit (as described above for other embodiments) between bushing 216 and shaft 211. To obtain this friction, an interference fit preferably exists between shaft 211 and bushing 216. Additional friction between slidable-engagement member 210 and second arm 212 helps to hold shaft 76, and thus fins 202 and 203, in place. Stated another way, the interference fit between bushing 216 and shaft 211 is preferably selected so that shaft 211 can be easily turned with a screwdriver to adjust the fins 202 and 203, but incidental forces exerted on fins 202 and 203 during normal use will not change the adjustment of fins 202 and 203. Because first arm 80 and second arm 212 are located inside cavity 81, they are protected from being moved by the impact of debris in water 43 or from the inertial forces from water 43 itself. This arrangement embodies herein a guard means for preventing accidental changing of the below described adjustable-depth means.

Another function of bushings 216 and 217 is to keep water 43 from entering lure body 46. It is desirable that crankbait fishing lure 200 have a constant buoyancy so that it remains at the same depth in water 43. One (preferred) way to accomplish this is to exclude water 43 from cavity 81 with bushings 216 and 217. Another way to accomplish a constant buoyancy is to allow water 43 (shown in FIG. 2) to freely enter cavity 81. This could be accomplished by providing holes (not shown) in lure body 46 to allow water 43 to enter (and exit) cavity 81. If water 43 is allowed to freely enter cavity 81, then bushings 216 and 217 need not form a water tight seal. Bushings 216 and 217 are preferably comprised of rubber, plastic, or similar material, but may be integral with the material of lure body 46. If one of the functions of bushings 216 and 217 is to exclude water 43 (the inventor's best mode), then rubber is preferable.

Crankbait fishing lure 200 preferably also has all of the necessary features of a fishing lure, such as those features described above for crankbait fishing lures 42 and 107. These features include fish hooks 54 or a hooking means (shown for crankbait fishing lure 42 in FIG. 2) and an attachment ring 56 (see FIG. 12) or other device (attachment means) to attach crankbait fishing lure 200 to the fishing line 59 (as shown in FIG. 2). Thus, except as indicated otherwise, crankbait fishing lure 200 is preferably similar to, and preferably has the features of, the other embodiments of the crankbait fishing lure 42 and 107 described above. Furthermore, the first arm 80, the shaft 76, and the pitch control mechanism 208 embodies herein an adjustable-depth means, coupled to the above described diving means, for adjustably setting the traveling depth of the fishing lure (crankbait fishing lure 200).

Figure 17:
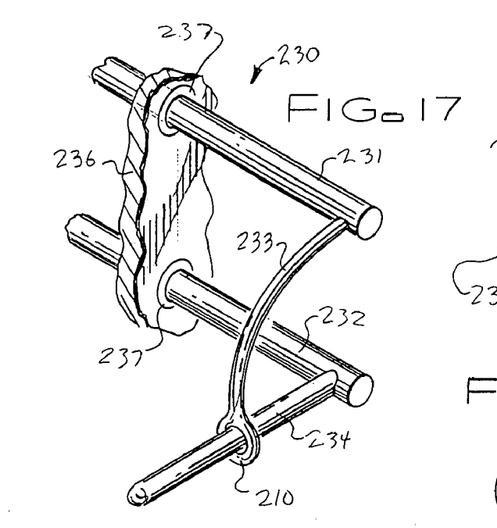
FIG. 17 is a partial sectional perspective view illustrating a preferred embodiment of the system and apparatus for moving a shaft.

The apparatus 230 that forms the pitch control mechanism 208 of crankbait fishing lure 200 would be useful in other applications, whenever it is desirable to have the rotation of one shaft, through part of a revolution, to effect a rotation of another parallel shaft, through part of a rotation, in the same direction of rotation. Various embodiments of this general apparatus 230 for moving a shaft are shown in greater detail in FIGS. 17–23. FIG. 17 is a partial sectional perspective view illustrating a preferred embodiment of the apparatus 230 for moving a shaft. The apparatus 230 for moving a shaft is preferably comprised of second shaft 231, first shaft 232, second arm 233, slidable-engagement member 210, first arm 234, and a structure 236 with bushings 237. Bushings 237 on second shaft 231 are sometimes herein identified as second bushings, while bushings 237 on first shaft 232 are sometimes herein identified as first bushings. Shaft 211 described above is one embodiment of second shaft 231, and shaft 76 described above is one embodiment of first shaft 232. Similarly, second arm 212 described above is one embodiment of second arm 233, and first arm 80 described above is one embodiment of first arm 234. Slidable-engagement member 210 is preferably the same as described above. Lure body 46 described above is one embodiment of structure 236, and bushings 216 and 217 described above are one embodiment of bushings 237.

Figure 18:
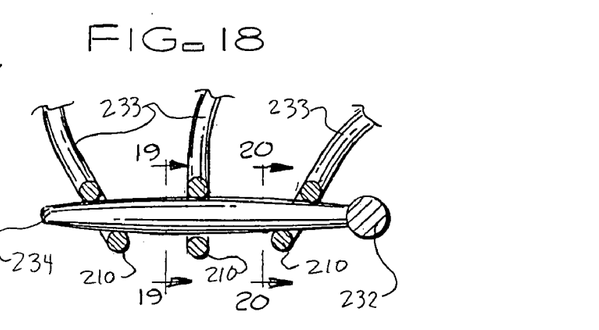
FIG. 18 is a partial sectional side view illustrating an alternate embodiment of the system and apparatus for moving a shaft wherein the cross section of the first arm is not constant.
Figures 19, 20:
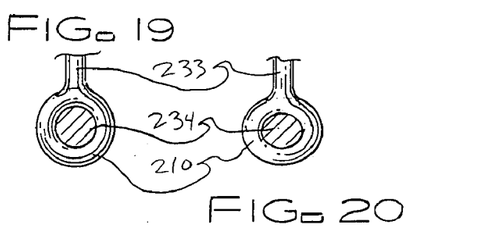
FIG. 19 is a partial sectional back view showing the slidable-engagement member and a cross section of the center of the first arm.
FIG. 20 is a partial sectional back view showing the slidable-engagement member and a cross section near one end of the first arm.

FIG. 18 is a partial sectional side view illustrating an alternate preferred embodiment of the apparatus 230 for moving a shaft wherein the cross section of the first arm 234 is not constant. Illustrating this same alternate embodiment, FIG. 19 is a partial sectional back view showing the slidable-engagement member 210 and a cross section of the center of the first arm 234. Similarly, FIG. 20 is a partial sectional back view showing the slidable-engagement member 210 and a cross section near one end of the first arm 234. As can be seen in FIG. 18, slidable-engagement member 210 is preferably perpendicular to first arm 234 only when slidable-engagement member 210 is in the center of first arm 234. Thus, in order to avoid either interference or clearance (slop) between slidable-engagement member 210 and first arm 234, the cross section of first arm 234 varies along its length as shown. First arm 234 preferably has a gradually varying cross section and preferably is thicker in the middle, at least in the one dimension shown, than at the ends. In contrast, in the preferred embodiment shown in FIG. 17, where the cross section of first arm 234 is constant along its length, the diameter of first arm 234 is selected to avoid interference when slidable-engagement member 210 is at the end of its travel. Thus, in the preferred embodiment shown in FIG. 17, slop would exist between slidable-engagement member 210 and first arm 234 when slidable-engagement member 210 is in the middle of its travel. As is apparent to one skilled in the art of mechanics, this slop between slidable-engagement member 210 and first arm 234 would result in slop between second shaft 231 and first shaft 232, which may be undesirable in some applications of apparatus 230.

Figure 21:
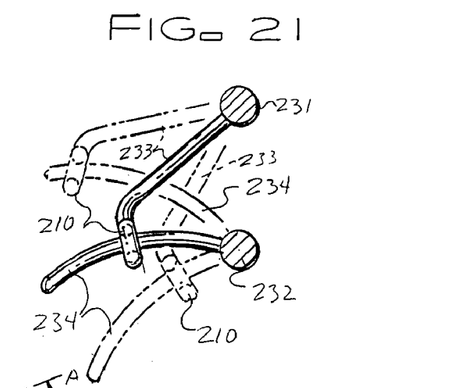
FIG. 21 is a partial sectional side view of an alternate embodiment of the system and apparatus for moving a shaft wherein the second arm is straight with a bend at the slidable-engagement member, and the first arm is curved.

FIG. 21 is a partial sectional side view of an alternate preferred embodiment of the apparatus 230 for moving a shaft wherein the second arm 233 is straight with a bend at the slidable-engagement member 210, and the first arm 234 is curved, as shown. FIG. 21 illustrates that it is not necessary that second arm 233 be curved (as shown in FIG. 17) as long as slidable-engagement member 210 is at the correct angle relative to first arm 234. However, having second arm 233 curved, as shown in FIG. 17, may be preferable, to avoid a stress-concentration factor at the bend shown in FIG. 21. Having first arm 234 curved so that it is concave away from second arm 233, as shown, has the disadvantage that the tilt of slidable-engagement member 210 relative to the cross section of first arm 234 is exaggerated. However, the curve in first arm 234 has potential advantages that will be discussed with reference to FIG. 23 below.

Another way to address the slop problem discussed above is to provide a pivot (not shown) at the location of the bend in second arm 233 shown in FIG. 21. Thus, slidable-engagement member 210 would remain perpendicular to first arm 234 at all times. Such a pivot would preferably be a pinned joint of a type familiar to a person of ordinary skill in the art of mechanics. In this embodiment (not shown), slidable-engagement member 210 could be cylindrical in shape with a protruding ear (or ears) to accommodate the pivot just described. The hollow cylinder of the pivoted slidable-engagement member 210 would slidably fit over first arm 234.

Figure 22:
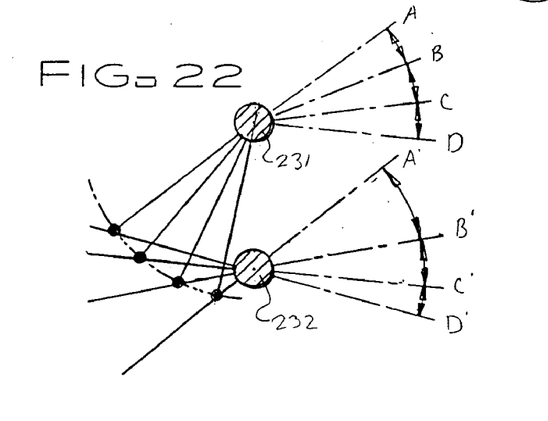
FIG. 22 is a partial sectional side view of the preferred embodiment of the system and apparatus for moving a shaft illustrating the movement of the first shaft relative to movements of the second shaft.

FIG. 22 is a partial sectional side view of the preferred embodiment of the apparatus 230 for moving a shaft illustrating the movement of the first shaft 232 relative to movements of the second shaft 231. As can be seen, the relative movement of first shaft 232 is greater when slidable-engagement member 210 is closer to first shaft 232. This non-proportional movement of shafts 231 and 232 may be an advantage in some situations, but may be a disadvantage in others. Similarly, the torque amplification from second shaft 231 to first shaft 232 would be greater when slidable-engagement member 210 is farthest from first shaft 232.

Figure 23:
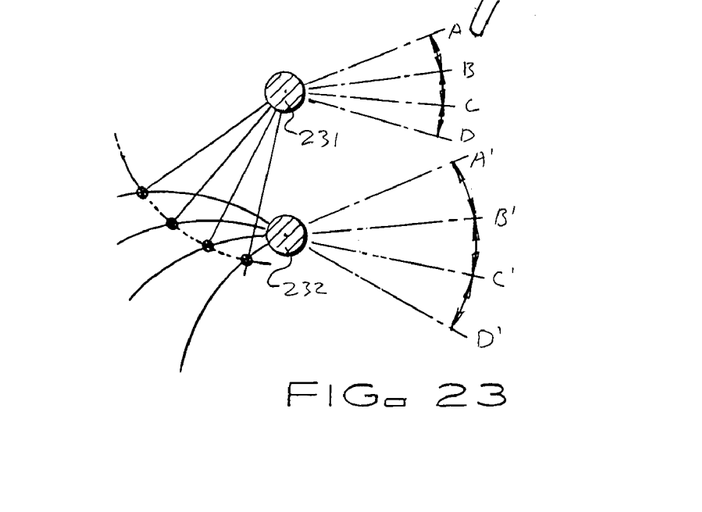
FIG. 23 is a partial sectional side view of an alternate embodiment of the system and apparatus for moving a shaft illustrating the movement of the first shaft relative to movements of the second shaft.

FIG. 23 is a partial sectional side view of the alternate embodiment of the apparatus 230 for moving a shaft wherein first arm 234 is curved (as shown in FIG. 21), illustrating the movement of the first shaft 232 relative to movements of the second shaft 231. As can be seen, when first arm 234 is curved (concave away from second shaft 231) the angular motion of second shaft 231 and first shaft 232 are more closely and directly proportional.

If first arm 234 was curved in the opposite direction (concave toward second shaft 231 and not shown) then the rotational movement of first shaft 232 would be reduced, and the lack of proportionality in shaft movement (first shaft 232 relative to second shaft 231) would be exaggerated.

Figure 24:
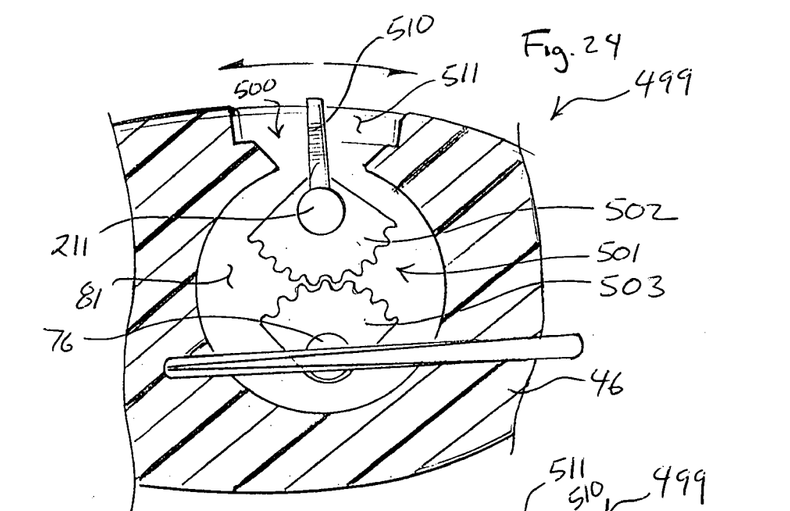
FIG. 24 is a partial sectional side view, illustrating the arrangement of an alternate embodiment of a pitch control mechanism of another embodiment of a crankbait fishing lure.
Figures 25, 26:
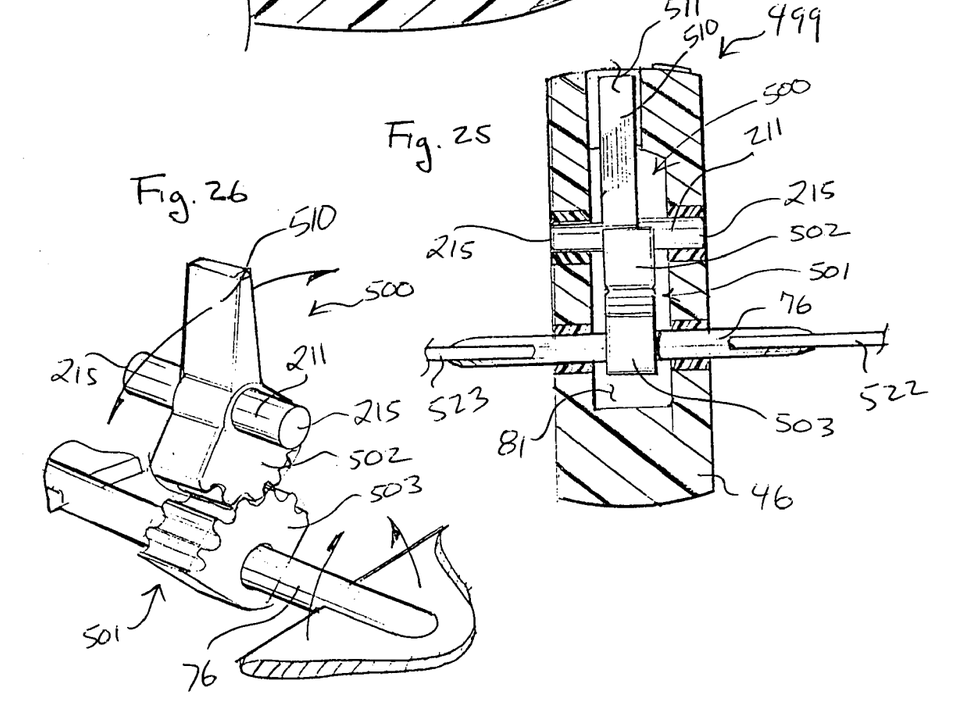
FIG. 25 is partial sectional back view of the pitch control mechanism of FIG. 24.
FIG. 26 is a perspective view of the pitch control mechanism of FIG. 24.
Figure 27:
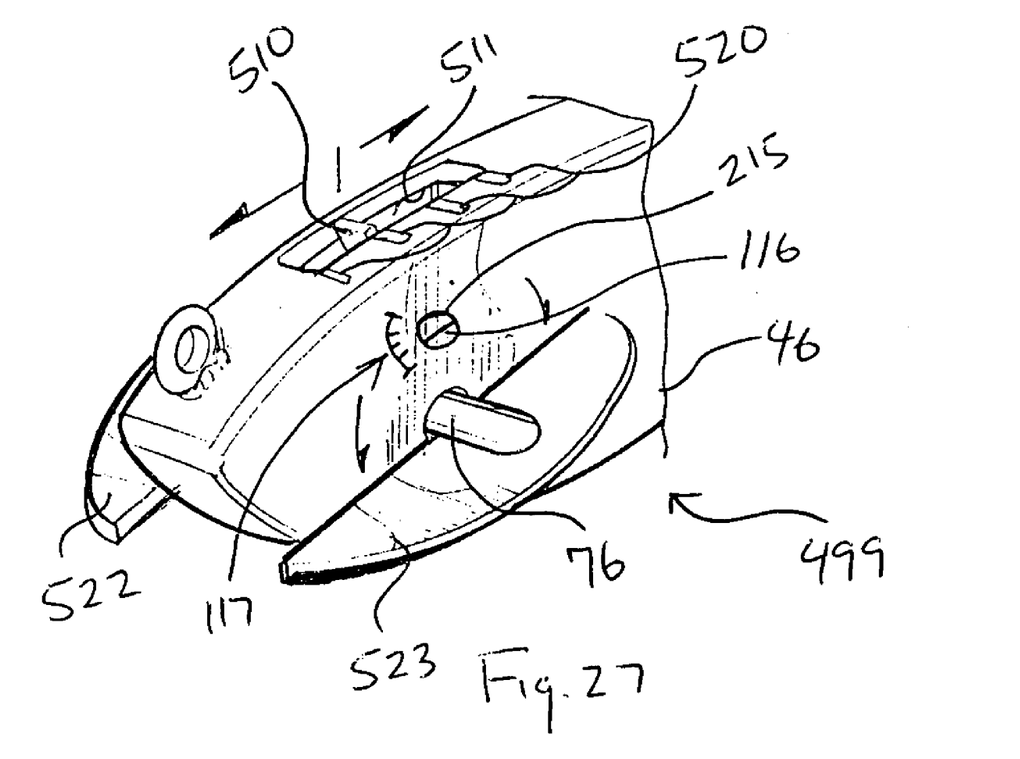
FIG. 27 is a fragmented perspective view of the crankbait fishing lure of FIG. 24.

FIG. 24 is a partial sectional side view, illustrating the arrangement of a pitch control mechanism 500 of crankbait fishing lure 499. FIG. 25 is partial sectional back view of the pitch control mechanism of FIG. 24. FIG. 26 is a perspective view of pitch control mechanism 500, and FIG. 27 is a fragmented perspective view of crankbait fishing lure 499. Reference is made to FIGS. 24–26 in relevant part throughout the ensuing discussion. In common with the previously described fishing lure embodiments designated 107 and 200, fishing lure 499 shares body 46, body cavity 81, shaft 211 including ends 215 thereof, and shaft 76 including fins 522,523 each attached to the respective end portions thereof. Other common elements shared between fishing lure 499 and fishing lures 107 and 200 will not be discussed. Nevertheless, unlike fishing lures 107 and 200, pitch control mechanism 500 of fishing lure 499 incorporates a gear assembly 501, which consists of a gear 502 carried by shaft 211 and an opposing gear 503 carried by shaft 76. Gears 502,503 meshingly interact, whereby rotation of shaft 211 urges corresponding rotation of shaft 76 and the coincident adjustment of the fins attached to shaft 76 for pitch control. In the embodiment set forth in FIGS. 24 and 25, a handle 510 attached to shaft 211 projects upward through body 46 and through an opening 511 formed through the top of body 46, which can be used to rotate shaft 211. In FIG. 27, depth selection markers 520 are carried by body 46 alongside opening 511. As seen in FIG. 27, ends 215 (only one end 215 shown) of shaft 211 serve as artificial eyes so that crankbait fishing lure 499 resembles a small fish, thus functionally attracting the larger fish that feed on smaller fish. Optionally, crankbait fishing lure 499 can incorporate groove 116 and depth-selection markers 117 as illustrated in FIG. 27 and as previously described in connection with crankbait fishing lure 107.

The present invention is described above with reference to preferred embodiments. However, those skilled in the art will recognize that changes and modifications may be made in the described embodiments without departing from the nature and scope of the present invention. Various further changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

What is claimed is:

1. A fishing lure, comprising:
    a body with first and second opposed sides;
    a cavity within the body between the respective sides of the body;
    a first member, extending into the cavity, rotatably carried by the body and having first and second end portions disposed adjacent the respective sides of the body;
    a fin carried by each of the end portions of the first member;
    a second member, extending into the cavity, rotatably carried by the body; and
    means enclosed within the cavity interacting between the first member and the second member, whereby rotation of the second member urges corresponding rotation of the first member.

2. The fishing lure of claim 1, wherein the means interacting between the first member and the second member comprises an arm of one of the first member and the second member and an end of the other of the first member and the second member interacting with the arm.

3. The fishing lure of claim 1, wherein the means interacting between the first member and the second member comprises a gear assembly.

4. The fishing lure of claim 3, wherein the gear assembly comprises a first gear carried by the first member meshingly engaged to a second gear carried by the second member.

5. The fishing lure of claim 1, further comprising at least hook supported by the body for hooking a fish.

6. The fishing lure of claim 1, further comprising an eyelet supported by the body.

7. In a fishing lure having a body with first and second opposed sides, a mechanism therein for selectively adjusting the running depth of the lure comprising:
- a cavity within the body between the respective sides of the body;
- a first member, extending into the cavity, rotatably carried by the body and having first and second end portions disposed adjacent the respective sides of the body;
- a fin carried by each of the end portions of the first member;
- a second member, extending into the cavity, rotatably carried by the body; and
- means enclosed within the cavity interacting between the first member and the second member, whereby rotation of the second member urges corresponding rotation of the first member.

8. The mechanism of claim 7, wherein the means interacting between the first member and the second member comprises an arm of one of the first member and the second member and an end of the other of the first member and the second member interacting with the arm.

9. The mechanism of claim 7, wherein the means interacting between the first member and the second member comprises a gear assembly.

10. The mechanism of claim 9, wherein the gear assembly comprises a first gear carried by the first member meshingly engaged to a second gear carried by the second member.

11. The mechanism of claim 7, further comprising at least hook supported by the body for hooking a fish.

12. The mechanism of claim 7, further comprising an eyelet supported by the body.

13. A fishing lure, comprising:
- a body with first and second opposed sides;
- a cavity within the body between the respective sides of the body;
- a first member, extending into the cavity, rotatably carried by the body and having first and second end portions disposed adjacent the respective sides of the body;
- a fin carried by each of the end portions of the first member;
- a second member, extending into the cavity, rotatably carried by the body;
- means enclosed within the cavity interacting between the first member and the second member, whereby rotation of the second member urges corresponding rotation of the first member;
- at least hook supported by the body for hooking a fish; and
- an eyelet supported by the body.

14. The fishing lure of claim 13, wherein the means interacting between the first member and the second member comprises an arm of one of the first member and the second member and an end of the other of the first member and the second member interacting with the arm.

15. The fishing lure of claim 13, wherein the means interacting between the first member and the second member comprises a gear assembly.

16. The fishing lure of claim 15, wherein the gear assembly comprises a first gear carried by the first member meshingly engaged to a second gear carried by the second member.

* * * * *